United States Patent
Arakawa

(10) Patent No.: US 10,706,276 B2
(45) Date of Patent: Jul. 7, 2020

(54) IMAGE PROCESSING APPARATUS, CONTROL METHOD THEREFOR, AND STORAGE MEDIUM

(71) Applicant: CANON KABUSHIKI KAISHA, Tokyo (JP)

(72) Inventor: Junya Arakawa, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 15/881,482

(22) Filed: Jan. 26, 2018

(65) Prior Publication Data

US 2018/0218208 A1 Aug. 2, 2018

(30) Foreign Application Priority Data

Jan. 30, 2017 (JP) .................................. 2017-014513

(51) Int. Cl.
*G06K 9/00* (2006.01)
*G06K 9/62* (2006.01)
*G06F 16/583* (2019.01)
*G06K 9/72* (2006.01)
*H04N 1/00* (2006.01)

(52) U.S. Cl.
CPC ..... *G06K 9/00463* (2013.01); *G06F 16/5846* (2019.01); *G06K 9/6254* (2013.01); *G06K 9/72* (2013.01); *H04N 1/00795* (2013.01); *G06K 2209/01* (2013.01); *H04N 2201/3229* (2013.01)

(58) Field of Classification Search
None
See application file for complete search history.

(56) References Cited

U.S. PATENT DOCUMENTS

| | | | |
|---|---|---|---|
| 2006/0050302 A1* | 3/2006 | Sawaguchi | G06F 16/51 358/1.15 |
| 2009/0279116 A1 | 11/2009 | Nishio | |
| 2010/0232690 A1* | 9/2010 | Kanatsu | G06K 9/00463 382/165 |
| 2014/0093170 A1* | 4/2014 | Ohguro | G06K 9/00469 382/176 |
| 2016/0065782 A1* | 3/2016 | Mori | H04N 1/00244 358/403 |
| 2016/0227066 A1* | 8/2016 | Shimazaki | H04N 1/04 |
| 2016/0301825 A1* | 10/2016 | Terao | G06F 16/93 |

FOREIGN PATENT DOCUMENTS

| | | |
|---|---|---|
| CN | 101577776 A | 11/2009 |
| CN | 104683633 A | 6/2015 |
| CN | 105847632 A | 8/2016 |
| JP | 2011-15348 A | 1/2011 |

* cited by examiner

*Primary Examiner* — Hadi Akhavannik
(74) *Attorney, Agent, or Firm* — Canon U.S.A., Inc., IP Division

(57) ABSTRACT

An image processing apparatus includes a character recognition processing unit configured to execute character recognition processing on the image data, an acquisition unit configured to acquire one or more character string blocks included in the image data, from the image data, a selection unit configured to select a character string block to be used for setting of a file name, from among the one or more character string blocks acquired by the acquisition unit, and a setting unit configured to set the file name of image data by using a character recognition result of the character recognition processing unit for the character string block selected by the selection unit.

16 Claims, 14 Drawing Sheets

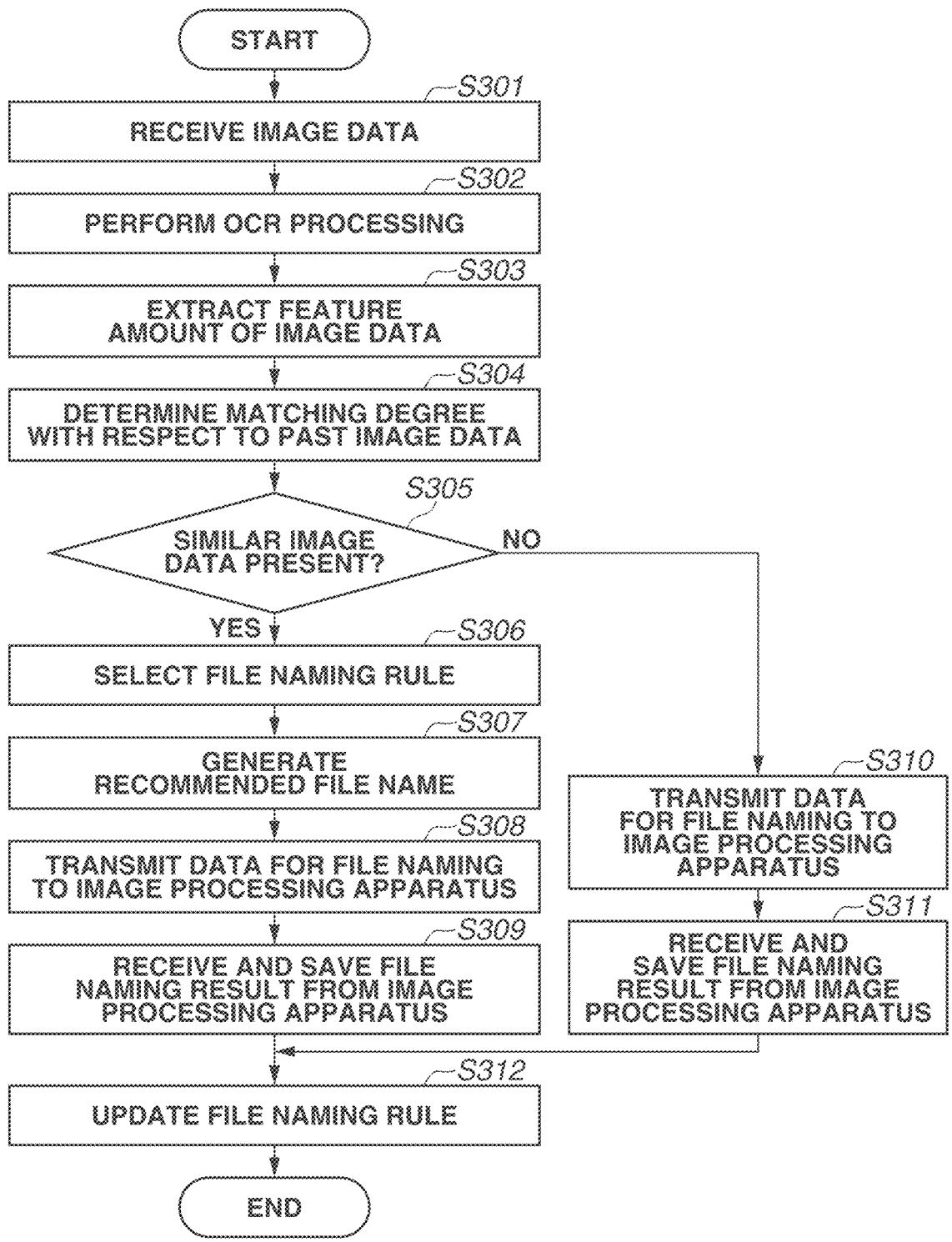

FIG.4

ORDER

November 1, 2015

To Nishitoride Hakusan Shokai Corporation

We would like to place an order as follows.　　Order Number  123456  987

Delivery Date  October 25, 2015

| No | | Quantity | Unit Price | Amount | Remarks |
|---|---|---|---|---|---|
| 1 | Product/Item/Material Name 1 | 10 | 500 | 5,000 | |
| 2 | Product/Item/Material Name 2 | 100 | 11,000 | ###### | |
| 3 | Product/Item/Material Name 1 | 200 | 500 | 100,000 | |
| 4 | Product/Item/Material Name 3 | 10 | 10,000 | 100,000 | |
| 5 | Product/Item/Material Name 4 | 20 | 13,000 | 260,000 | |
| 6 | Product/Item/Material Name 5 | 50 | 14,000 | 700,000 | |
| 7 | Product/Item/Material Name 8 | 20 | 17,000 | 340,000 | |
| 8 | Product/Item/Material Name 9 | 30 | 18,000 | 540,000 | |
| 9 | Product/Item/Material Name 11 | 40 | 20,000 | 800,000 | |
| 10 | Product/Item/Material Name 12 | 10 | 21,000 | 210,000 | |
| 11 | Product/Item/Material Name 15 | 30 | 24,000 | 720,000 | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| Total Amount (Consumption Tax Included) | | | | 4,875,000 | |

| Ordering Person | Confirming Person |
|---|---|
| | |

〒111-1111
Toride, Toride city, Ibaraki Prefecture
Toride Shoji Corporation
Representative Director  Taro Ibaraki
TEL 1111-11-1111    FAX 1111-11-1111

(1) <OCR area 1>_<OCR area 2>_<Date>.pdf
   801  802  803

(2) OCR area 1
   804  805

| Sub-rule ID | Detail rule | | |
|---|---|---|---|
| | Character string block ID | OCR setting | Individual false conversion correction rule |
| 1 | 0001 | [Fixed character string: ORDER] | — |

810  811  812

(3) OCR area 2

| Sub-rule ID | Detail rule | | |
|---|---|---|---|
| | Character string block ID | OCR setting | Individual false conversion correction rule |
| 1 | 0003 | [OCR result: no text type specified]<br>[Fixed character string removal: "To"] | — |

820  821

(4) Date

| Sub-rule ID | Detail rule |
|---|---|
| 1 | Use original-document scanned date in form of YYYYMMDD |

830

(5) ORDER_Nishitoride Hakusan Shokai Corporation_20160725.pdf

FIG.9

(1) <OCR area 1>_<Date>_<Arbitrary character string>_<User name>.pdf (2) OCR area 1

| Sub-rule ID | Detail rule | | |
|---|---|---|---|
| | OCR setting | | Individual false conversion correction rule |
| | Character string block ID | | |
| 1 | 0002 | [OCR result: 16 characters/no text type specified] [Fixed character string removal: "Date"] | E → 3 |

901  902

(3) Date

| Sub-rule ID | Detail rule |
|---|---|
| 1 | Use original-document scanned date in form of YYYYMMDD |

903

(4) Arbitrary character string

| Sub-rule ID | Detail rule |
|---|---|
| 1 | Use [Person in charge] |

(5) User name

| Sub-rule ID | Detail rule |
|---|---|
| 1 | Acquire user name based on login name from LDAP server and use acquired user name |

904

(6)

| OCR area 1 | | |
|---|---|---|
| OCR result | OCR setting application | Individual false conversion correction rule application |
| Order Number R23E2 | Order Number R23E2 Date | Order Number R2332 |

905  906  907

(7) ORDER NUMBER R2332_20161024_Person in charge_Sato Taro.pdf

FIG. 10

(1) OCR area 1

| Sub-rule ID | Detail rule | |
|---|---|---|
| | Character string block ID | Individual false conversion correction rule |
| 1 | 0002 | E → 3 |

*1001  1002*

(2) OCR area 3

| Image cluster ID | Image ID | OCR result | OCR setting application | Individual false conversion correction rule application | User modification result |
|---|---|---|---|---|---|
| 3 | 23 | Order Number T2345 Date | Order Number T2345 | Order Number T2345 | Order Number T2345 (not modified) |
| 3 | 34 | Order Number R23E2 Date | Order Number R23E2 | Order Number R2332 | Order Number R2332 (not modified) |
| 3 | 53 | Order Number 〒2020 Date | Order Number 〒2020 | Order Number T2020 | Order Number T2020 |

[OCR result: 16 characters/no text type specified]
[Fixed character string removal: " Date"]

*1003  1004  1006  1007  1005*

(3) OCR area 1

| Sub-rule ID | Detail rule | |
|---|---|---|
| | Character string block ID | Individual false conversion correction rule |
| 2 | 0002 | E → 3, 〒 → T |

[Fixed character string: Order Number][OCR result: 5 characters/ no text type specified][Fixed character string removal: "To "]

(4) OCR area 3

| Image cluster ID | Image ID | OCR result | OCR setting application | Individual false conversion correction rule application | User assumption modification result |
|---|---|---|---|---|---|
| 3 | 23 | Order Number T2345 Date | Order Number T2345 | Order Number T2345 | Order Number T2345 (not modified) |
| 3 | 34 | Order Number R23E2 Date | Order Number R23E2 | Order Number R2332 | Order Number R2332 (not modified) |
| 3 | 53 | Order Number 〒2020 Date | Order Number 〒2020 | Order Number T2020 | Order Number T2020 (not modified) |

*1008  1009  1010*

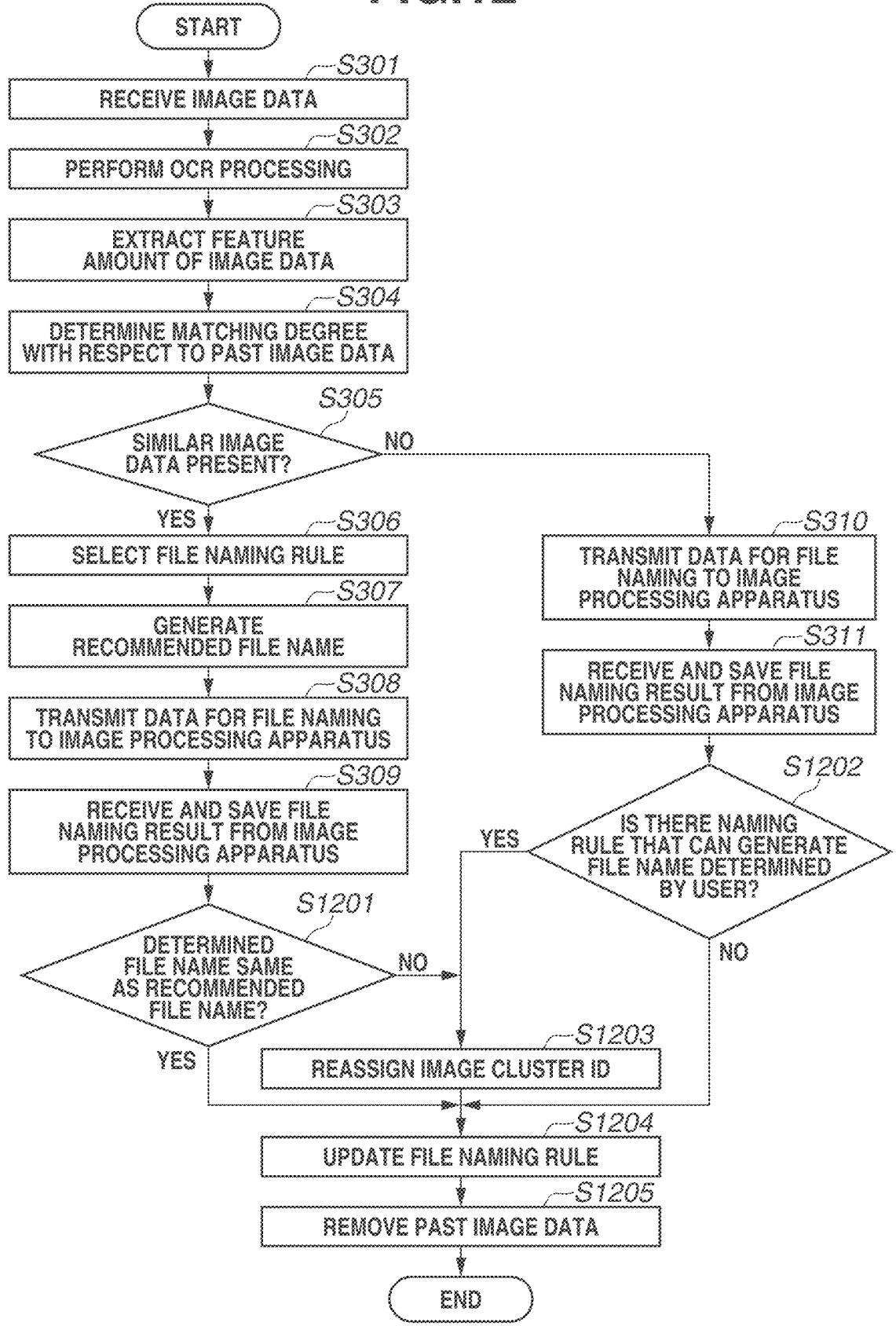

IMAGE PROCESSING APPARATUS, CONTROL METHOD THEREFOR, AND STORAGE MEDIUM

BACKGROUND OF THE INVENTION

Field of the Invention

The present invention relates to an image processing apparatus, a control method therefor, and a storage medium.

Description of the Related Art

There is a work flow for reading text of a sheet (an original document) such as a business form by using a reader, and obtaining image data of a digitized image of the original document. In this flow, the digitized image data is given a file name according to the type or content of the original document and stored into a predetermined folder. In this process, if a user gives the file name by manual input, the types and the number of original documents increase, which becomes a significant burden on the user. In particular, in a case where the user inputs the file name by using a software keyboard due to a restriction on a user interface (UI), the burden on the user increases. In addition, in a case where the user may be necessary to create a new folder, which also increases the burden on the user.

As a technique for solving such an issue, Japanese Patent Application Laid-open No. 2011-15348 discusses the following method. First, a type of original document and other information, such as a file naming rule and a storage location rule, are associated with each other, and registered. When an original document is read, the type of the read original document is recognized, and a file name and a storage location are automatically recommended to a user, by using a naming rule and a storage location rule corresponding to the read original document. Therefore, by setting a file naming rule and a storage location rule for each type of original document only once, the user is free from the need for giving a file name and specifying a storage location, afterward. This can greatly reduce a burden on the user.

According to the above-described related technique, it is necessary for the user to register recommended setting beforehand. This places a significant burden on a user who tries to register a complicated file naming rule. This burden of registration of a complicated naming rule requires a large amount of user operation to define the complicated naming rule. An image processing apparatus described in the present specification provides a technique of naming a file by using a character string included in image data.

SUMMARY OF THE INVENTION

The present invention is directed to an image processing apparatus including a configuration described below. In other words, according to an aspect of the present invention, an image processing apparatus includes a character recognition processing unit configured to execute character recognition processing on the image data, an acquisition unit configured to acquire one or more character string blocks included in the image data, from the image data, a selection unit configured to select a character string block to be used for setting of a file name, from among the one or more character string blocks acquired by the acquisition unit, and a setting unit configured to set the file name of image data by using a character recognition result of the character recognition processing unit for the character string block selected by the selection unit.

Further features of the present invention will become apparent from the following description of exemplary embodiments with reference to the attached drawings.

BRIEF DESCRIPTION OF THE DRAWINGS

The attached drawings are included in the exemplary embodiments of the present invention. The attached drawings are used to describe the principle of the present invention, together with the description thereof.

FIG. 3 is a flowchart illustrating processing for generation of information for naming a file of image data by the file naming apparatus, according to the first exemplary embodiment.

FIG. 4 is a diagram illustrating an example of an original document to be read, in step S201 in FIG. 2.

FIGS. 6A and 6B illustrate the example of the UI for file naming to be displayed by the display unit of the image processing apparatus according to the first exemplary embodiment.

FIG. 8 is a diagram illustrating a file naming rule according to the first exemplary embodiment.

FIG. 9 is a diagram illustrating details of another file naming rule according to the first exemplary embodiment.

FIG. 10 is a diagram illustrating an example of update of a rule in a <OCR area 1> in FIG. 9 according to the first exemplary embodiment.

FIG. 12 is a flowchart illustrating processing for generation of information for naming a file of image data by a file naming apparatus according to a second exemplary embodiment.

DESCRIPTION OF THE EMBODIMENTS

Exemplary embodiments of the present invention will be described in detail below with reference to the attached drawings. The exemplary embodiments to be described below are not intended to limit the present invention according to the scope of claims, and not all combinations of features to be described in the exemplary embodiments are necessary for a solution to the present invention.

Figure 1:
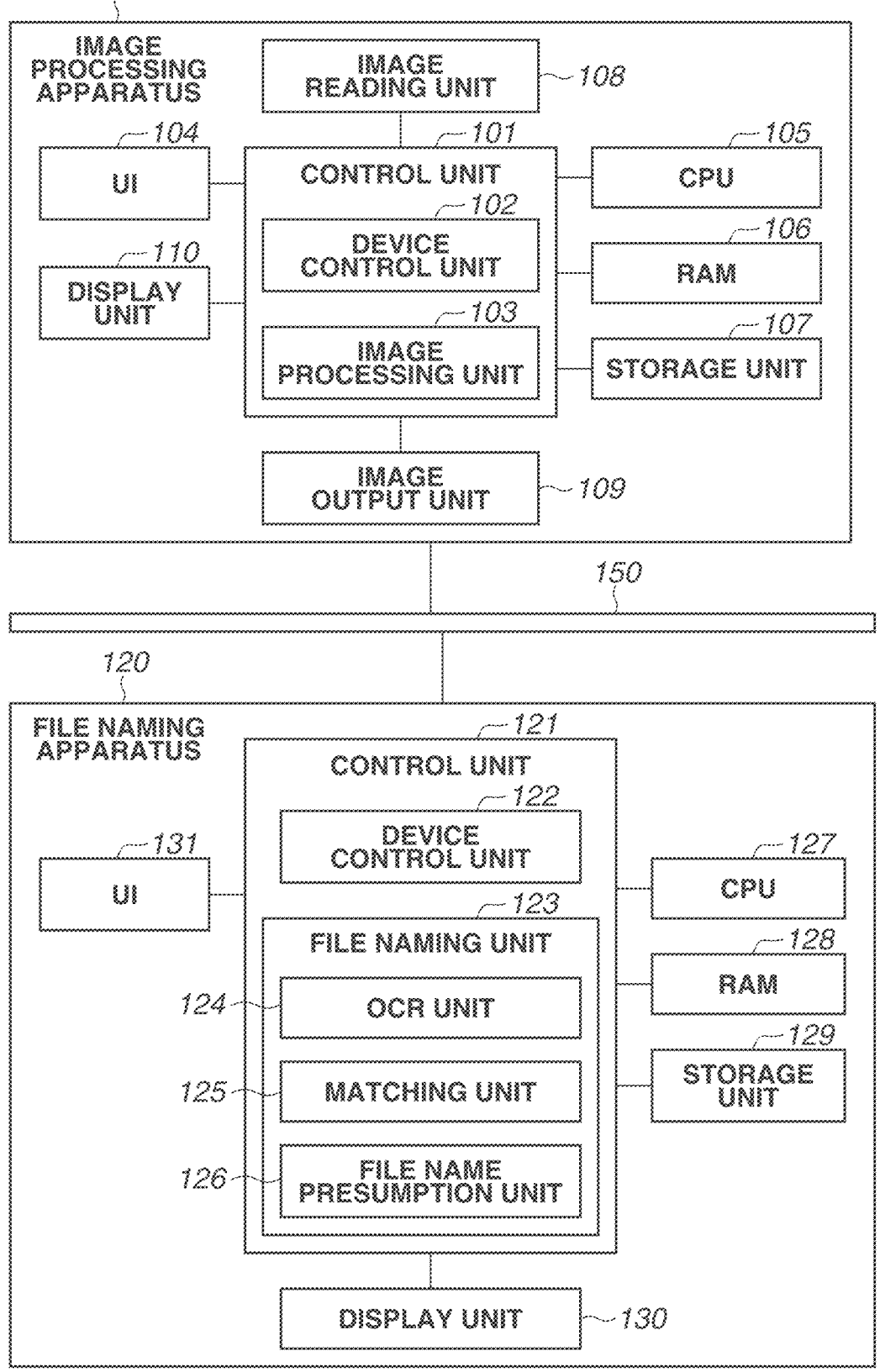
FIG. 1 is a block diagram illustrating a configuration example of an information processing system according to a first exemplary embodiment of the present invention.

FIG. 1 is a block diagram illustrating a configuration example of an information processing system according to a first exemplary embodiment of the present invention. The system according to the first exemplary embodiment will be described as a system that acquires image data of an original document by optically reading the original document with a device such as a scanner, and gives a file name to a file of the image data. This system includes an image processing apparatus 100, and a file naming apparatus 120, as illustrated in FIG. 1. Here, the image processing apparatus 100 and the file naming apparatus 120 (also an image processing apparatus) are connected to be able to perform data communication with each other via a network 150.

The image processing apparatus 100 includes a user interface (UI) 104, a central processing unit (CPU) 105, a random access memory (RAM) 106, a storage unit 107, an image reading unit 108, an image output unit 109, and a display unit 110. These units are connected to be able to communicate with each other via a control unit 101. The control unit 101 has a device control unit 102 and an image processing unit 103. The device control unit 102 controls the entire image processing apparatus 100. The image processing unit 103 processes image data.

When the image processing apparatus 100 is powered on, the CPU 105 executes an initial program of the storage unit 107, thereby reading a main program from the storage unit 107, and loading the read main program into the RAM 106. The RAM 106 is used for program storage, and used as a main memory for work. The CPU 105 controls operation of the image processing apparatus 100, by executing the program loaded into the RAM 106. Therefore, the CPU 105 implements the functions of the units such as the device control unit 102 and the image processing unit 103 of the control unit 101, by executing the above-described program.

The image reading unit 108 is, for example, a scanner. The image reading unit 108 reads a paper document (an original document), and acquires image data of a digitized image of the original document. Upon receiving the image data acquired by the image reading unit 108, the control unit 101 stores the received image data into the storage unit 107. The control unit 101 then transmits the image data stored in the storage unit 107 to the file naming apparatus 120 via the network 150, when executing naming processing to be described below. Further, the control unit 101 receives information for file naming from the file naming apparatus 120, via the network 150. This information for file naming will be described in detail below.

The control unit 101 generates a UI screen for file naming, by using the image data of the original document stored in the storage unit 107, and the information for file naming received from the file naming apparatus 120. The control unit 101 displays the generated UI screen at the display unit 110. Further, the control unit 101 supplies the image data, of the original document stored in the storage unit 107, to the image output unit 109. The image output unit 109 executes processing for outputting the image data in various forms. For example, the image output unit 109 stores the image data according to the original document into a storage medium. Alternatively, the image output unit 109 prints an image based on the image data, on a medium such as a paper medium.

The UI 104 includes, for example, a keyboard, a mouse (registered trademark), and other input-output devices, so that various setting values or specification values can be input and set. A user uses the UI 104 according to the first exemplary embodiment to give a file name. The control unit 101 transmits the given file name to the file naming apparatus 120, via the network 150.

The image processing apparatus 100 described above is only an example. The image processing apparatus 100 includes the image reading unit 108 and the image output unit 109, but may have a configuration in which the image output unit 109 is not included.

The file naming apparatus 120 includes a CPU 127, a RAM 128, a storage unit 129, a display unit 130, and a UI 131. These units are connected to be able to communicate with each other, via a control unit 121. Further, the control unit 121 has a device control unit 122 and a file naming unit 123. The device control unit 122 controls the entire file naming apparatus 120. The file naming unit 123 generates information for file naming. The file naming unit 123 according to the first exemplary embodiment has an optical character recognition (OCR) unit 124, a matching unit 125, and a file name presumption unit 126. The OCR unit 124 performs optical character recognition of image data. The matching unit 125 performs matching between pieces of image data. The file name presumption unit 126 presumes a file name of image data.

The UI 131 includes, for example, a keyboard, a mouse (registered trademark), and other input-output devices, so that various setting values or specification values can be input. When the file naming apparatus 120 is powered on, the CPU 127 executes an initial program of the storage unit 129, thereby reading a main program from the storage unit 129, and loading the read main program into the RAM 128. The RAM 128 is used for program storage, and used as a main memory for work. The CPU 127 controls operation of the file naming apparatus 120, by executing the program loaded into the RAM 128. Therefore, the CPU 127 implements the function of the control unit 121, by executing the above-described program. Further, the control unit 121 displays image data of an original document stored in the storage unit 129, at the display unit 130. Furthermore, the control unit 121 provides the file naming unit 123 with image data, which is transmitted from, the image processing apparatus 100 and saved, in the storage unit 129 of the file naming apparatus 120.

The file naming unit 123 analyzes the image data, and generates information for file naming. The control unit 121 then transmits the generated information to the image processing apparatus 100 via the network 150. Further, the control unit 121 supplies a file naming result received from the image processing apparatus 100, to the file naming unit 123. The file naming unit 123 updates a file naming rule, by using a final file naming result. The OCR unit 124 performs character recognition processing on the image data, thereby extracting character information included in the image data. The matching unit 125 calculates a similarity level between pieces of image data. The file name presumption unit 126 presumes a file naming rule based on a history of past file naming results, and generates a file name suitable for input image data.

The above-described configuration of the file naming apparatus 120 is only an example, and the present invention is not limited to this example. For example, the file naming apparatus 120 can be implemented by a computer apparatus such as a server, but may be configured such that the functions of the storage unit 129 and the file naming unit 123 are implemented by a remote computation source connected via the network 150 called a cloud. Further, the image processing apparatus 100 may be implemented such that the image processing apparatus 100 includes the functions of the file naming apparatus 120. Further, the file naming apparatus 120 may operate as an image processing apparatus that has functions of the image processing apparatus 100.

Next, processing to be executed by the system according to the first exemplary embodiment will be described.

Figure 2:
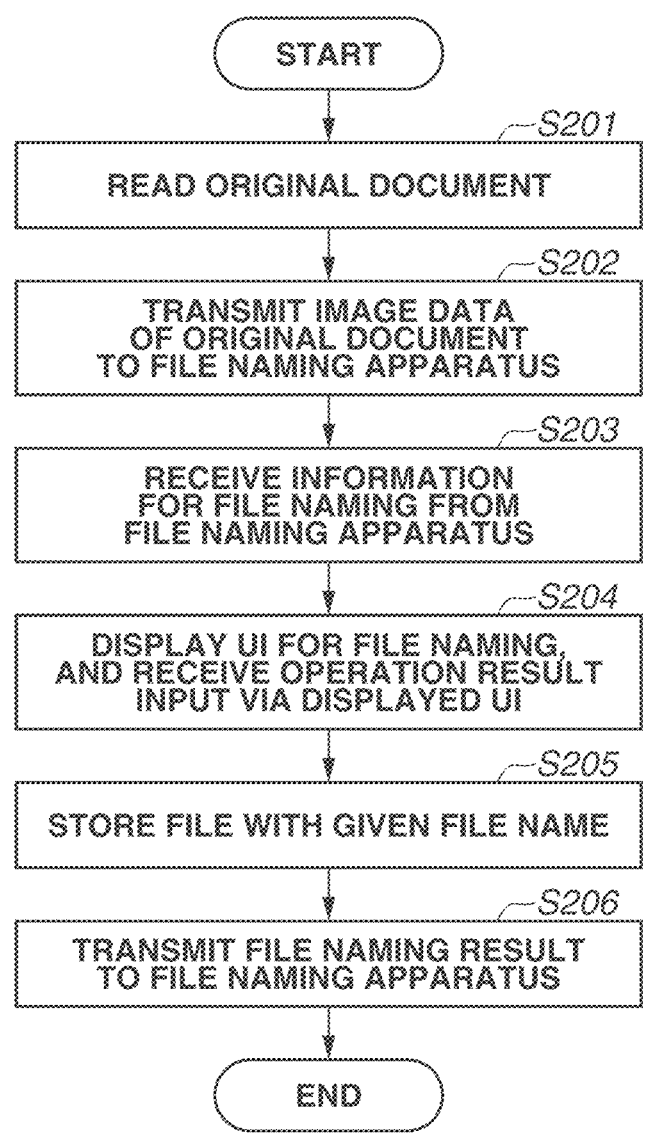
FIG. 2 is a flowchart illustrating processing in which an image processing apparatus reads an original document, gives a file name to image data of the original document, and transmits the file name to a file naming apparatus, according to the first exemplary embodiment.

FIG. 2 is a flowchart illustrating processing in which the image processing apparatus 100 reads an original document, gives a file name to image data of the original document, and transmits the file name to the file naming apparatus 120, according to the first exemplary embodiment. This processing begins when the UI 104 receives an instruction for reading an original document from the user. The CPU 105 loads a program from the storage unit 107 into the RAM 106, and executes the loaded program, thereby implementing the processing illustrated in this flowchart.

First, in step S201, the CPU 105 functions as the device control unit 102, and controls the image reading unit 108 to read an original document and acquire image data of the original document. The CPU 105 then subjects the image data to correction processing such as color conversion and tone correction by using the image processing unit 103, and stores image data obtained thereby into the RAM 106. The CPU 105 then saves the image data stored in the RAM 106, into the storage unit 107.

The processing then proceeds to step S202. In step S202, the CPU 105 functions as the device control unit 102, and transmits the image data saved in the storage unit 107 to the file naming apparatus 120 via the network 150. Afterward, the CPU 105 stops the processing, until receiving necessary information for file naming from the file naming apparatus 120 (a process which is later described in greater detail with reference to FIG. 3). The processing then proceeds to step S203. In step S203, the CPU 105 functions as the device control unit 102, and receives information necessary for generating a UI screen for file naming, from the file naming apparatus 120. The information to be received here includes information about a result of OCR of image data, and a recommended file name. The information about the OCR result includes information about a character string included in image data obtained by OCR processing. Specifically, the information about the OCR result includes a character string block ID, a character string block position, a character string block size, and a character string in a character string block, of each of all character string blocks included in the character block in the image data generated by scanning the document. The recommended file name information is information about a file name of image data, recommended from the content of this image data. The recommended file name information may be information indicating a specific file name, or may be information according to a UI screen for file naming. The latter is, for example, information that indirectly recommends a file name, such as forming a file name by combining a character string included in a character string block identification (ID) "2", and another character string included in a character string block ID "5".

The processing then proceeds to step S204. In step S204, the CPU 105 functions as the device control unit 102, and generates a UI screen for file naming, by using the information obtained from the file naming apparatus 120 in step S203. The CPU 105 then displays the generated UI screen at the display unit 110. Afterward, the CPU 105 accepts a file-naming instruction based on a user instruction input via the UI 104. Here, the CPU 105 appropriately updates the UI screen for file naming, based on an instruction from the UI 104. The processing proceeds to step S205, when the CPU 105 receives a notification indicating confirmation of a file name, from the UI 104.

Here, an example of the UI screen for file naming will be described with reference to FIGS. 4 to 7.

FIG. 4 is a diagram illustrating an example of an original document to be read in step S201 in FIG. 2. Here, an order is illustrated as the example.

FIGS. 5A through 6B illustrate an example of a UI for file naming to be displayed at the display unit 110 of the image processing apparatus 100 according to the first exemplary embodiment. Here, a case where the original document illustrated in FIG. 4 is read is illustrated.

Figure 5A:
FIGS. 5A and 5B illustrate an example of a user interface (UI) for file naming to be displayed by a display unit, of the image processing apparatus according to the first exemplary embodiment.

FIG. 5A illustrates an example of a screen to be displayed first as a UI screen, in a case where no recommended file name is present. Here, a character string block subjected to OCR processing is displayed in gray background color. This image includes an area that is not in gray background color even though this area is a character string portion. This indicates a character string block that has not been recognized in OCR. By selecting the character string block in gray background color, the user can specify the character string as a character string block to be used for file naming. In this way, the user can give a file name, by using a character string block included in image data.

Figure 5B:

FIG. 5B illustrates an example in which a character string block 501 written as "ORDER" is selected by the user. When the character string block 501 is selected, the UI screen is updated, and an encircled number "1" indicating the character string block 501 being selected is displayed above an upper left part of the character string block 501. The encircled number "1" indicates a character string block being selected first. In addition, a character string "ORDER", which is included in the character string block 501 and recognized in OCR, is displayed in a text box 502 for file naming (a file name).

Figure 6A:
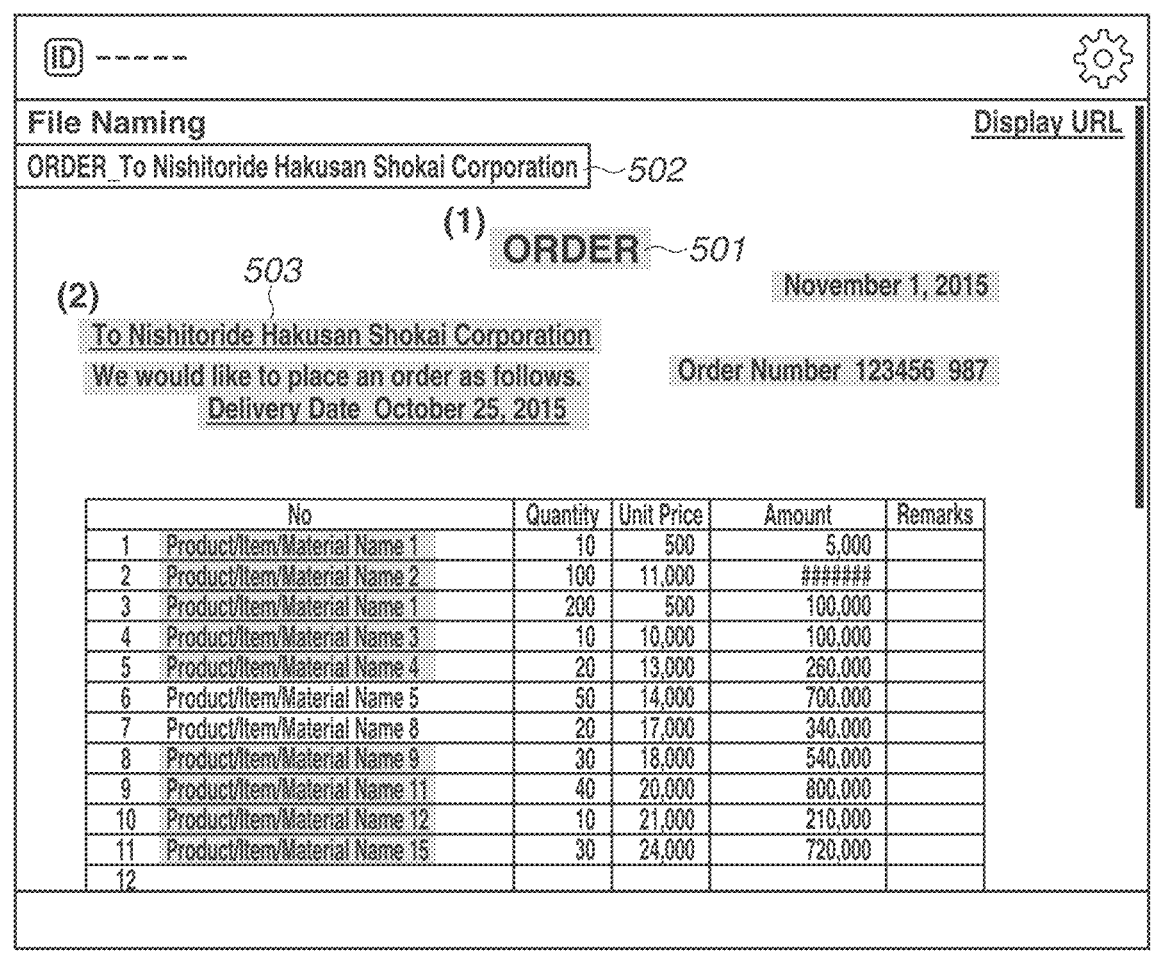

FIG. 6A illustrates a state where a character string block 503 written as "To Nishitoride Hakusan Shokai Corporation" is additionally selected by the user. When the character string block 503 is selected, the UI screen is updated, and an encircled number "2" indicating the character string block 503 being selected is displayed above an upper left part of the character string block 503. The encircled number "2" indicates a character string block being selected second. In addition, the character string "To Nishitoride Hakusan Shokai Corporation", which is included in the character string block 503 and recognized in OCR, is combined with the already displayed character string "ORDER" by using "_" and displayed in the text box 502 for file naming.

In this process, even if the user desires only to add a company name by specifying the character string block 503, the character string block reading "Nishitoride Hakusan Shokai Corporation" and the character string block reading "To" are combined, and recognized as one character string block in OCR. For this reason, the character string reading "To" is also displayed in the text box 502.

Figure 6B:

FIG. 6B illustrates a result of a case where the user selects the text box 502, and then edits the content by deleting "To".

In FIG. 6B, the character string included in the text box 502 is "ORDER_Nishitoride Hakusan Shokai Corporation". When the user presses a file naming button 504 in this state, the character string "ORDER_Nishitoride Hakusan Shokai Corporation" included in the text box 502 is determined as a file name of the image data. In this way, the user can give a name to a file, by utilizing a result of character recognition of image data obtained by reading an original document, without manually inputting a file name. However, some work is still necessary. Information about file naming including information about the user operation performed here is transmitted from the image processing apparatus 100 to the file naming apparatus 120 according to a flow to be described below. This information is then utilized for generation of a recommended file name.

Here, for example, in a case where a recommended file name created by the file naming apparatus 120 is present, the screen illustrated in FIG. 6B, for example, is displayed from the beginning. In this case, the user can give a name to a file, only by pressing the file naming button 504 in the screen in FIG. 6B. Therefore, work for file naming is considerably reduced.

Here, information about the recommended file name is information about a character string block to be used for file naming. Specifically, information is included which indicates that the character string block 501 and the character string block 503 are to be used for file naming, as a first character string and a second character string, respectively. Further, the character string included in the character string block 503 is modified from "To Nishitoride Hakusan Shokai Corporation", which corresponds to the actual OCR result, to "Nishitoride Hakusan Shokai Corporation". This is obtained by deleting "To" according to at file naming rule presumed using a past file naming result of the user. However, in the file naming apparatus 120, there is a possibility that "To" may be included as is, in a case where a presumed file naming rule is simple. The quality of a recommended file name depends on a presumed file naming rule. This presumption of a file naming rule will be described below.

Another UI example will be described with reference to FIG. 7.

Figure 7:
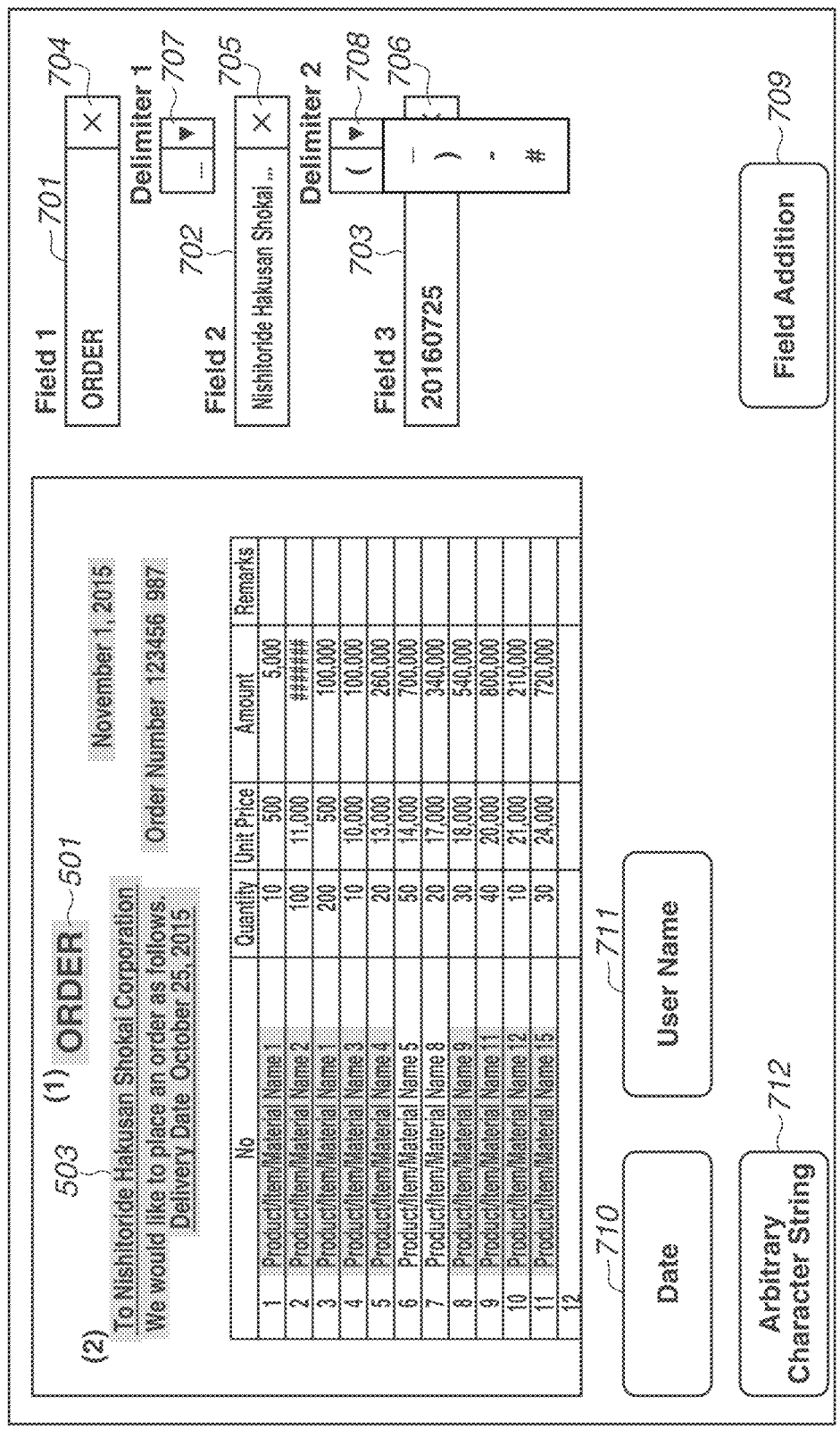
FIG. 7 is a diagram illustrating another example of the UI for file naming to be displayed by the display unit of the image processing apparatus according to the first exemplary embodiment.

FIG. 7 is a diagram illustrating another example of the UI screen for file naming to be displayed at the display unit 110 of the image processing apparatus 100 according to the first exemplary embodiment. A case where the original document illustrated in FIG. 4 is read is illustrated here as well.

In FIG. 7, not only a result of OCR but also other information can be used for file naming. First, each function part of the UI illustrated in FIG. 7 will be described. In fields 701 to 703, characters can be displayed and edited. A file name can be created by combining character strings in these fields. The user can select and thereby activate any of these fields, and then select a text portion (the character string blocks 501 and 503) to be used. The user can thereby input a character string held by the selected text portion, and edit the input character string. In the fields 701, 702, and 703, the user can delete the contents by using delete buttons 704, 705, and 706, respectively. In addition, when creating a file name, the user can specify a delimiter between character strings in each of these fields. Delimiter specification pull-downs 707 and 708 are each used to specify the delimiter. In the example illustrated in FIG. 7, the user can select any one of "no delimiter", "_", "(", ")", "-", and "#". In a case where the content in a field is deleted using any of the delete buttons 704 to 706, the content of the delimiter specification pull-down 707 or 708 corresponding to the deleted field is also deleted. When a field addition button 709 is pressed, a new field can be added to create a file name. For example, assume that the field addition button 709 is pressed, in a situation where only the fields 701 and 702 as well as the delimiter specification pull-down 707 are present. In this down corresponding to the field are added.

A character string is input into each field by a character string block recognized in OCR, a meta-information button, and an arbitrary character string button. The user can use the character string block recognized in OCR, by selecting a recognized character string block, as in FIG. 5A to FIG. 6B. For example, when the user presses the character string block 501 in FIG. 7 after activating the field 701, the character string "ORDER" included in the character string block 501 is input into the field 701. By performing similar operation, the user can input the character string "To Nishitoride Hakusan Shokai Corporation" included in the character string block 503, into the field 702.

Further, in the example illustrated in FIG. 7, a date button 710 and a user name button 711 are each provided as the meta-information button. For example, when the user presses the date button 710 after activating the field 703, the current date when the date button 710 is pressed is input into the field 703. Similarly, when the user presses the user name button 711 after activating the field 703, the name of the user performing the operation is input into the field 703. In this case, authentication processing for the user has been performed beforehand in the image processing apparatus 100. The user uses an arbitrary character string button 712 to input an arbitrary character string. For example, when pressing the arbitrary character string button 712 after activating the field 703, the user can input an arbitrary character string into the field 703. This character string is input using the UI 104.

The user can edit the character string thus input into each field, by using the UI 104. The UI illustrated in FIG. 7 has such characteristics that the user can efficiently input a file name, and the system can acquire effective information for presuming a file naming rule. In other words, the system can acquire information indicating what kinds of information are combined by the user to create a file name. In a case where the user manually inputs all of a file name, the system cannot acquire information indicating what kinds of information are combined to create the file name. In addition, in a case where only a character string block of an OCR result and an arbitrary character string can be used, it is necessary to input meta-information such as a user name, as an arbitrary character string. Therefore, it is difficult to recognize this character string as "meta-information" during rule presumption. In other words, when the user selects a component of a file name as in FIG. 7, accuracy of presuming a file naming rule can be improved. FIG. 7 is only an example, and a component of other file name may be selectable by the user. In the first exemplary embodiment, the user names a file, by using the UI screens described above.

Returning to FIG. 2, the description will continue. In step S205, the CPU 105 functions as the device control unit 102, and gives the file name determined in step S204 to the image data. Then, via the network 150, the CPU 105 stores the image data with the file name at an appropriate storage location, based on an instruction provided from the user through the UI 104. The processing then proceeds to step S206. In step S206, the CPU 105 transmits a file naming result to the file naming apparatus 120. Information to be transmitted here includes a finally determined file name, information of a character string block of OCR used for the file name, and information indicating that a character string in the character string block of OCR is modified by the user of the image processing apparatus 100. The information to be transmitted also includes information about meta-information such as a date used for the file name, and information about an arbitrary character string input by the user. Further, in a case where a recommended file name is present, information about whether the name is directly used as a file name is also included. This case will be described in detail below.

Next, processing in the file naming apparatus 120 according to the first exemplary embodiment will be described.

FIG. 3 is a flowchart illustrating processing for generation of information for naming a file of image data by the file naming apparatus 120, according to the first exemplary embodiment. The processing illustrated in this flowchart begins upon receipt of image data from the image processing apparatus 100. The CPU 127 loads a program from the storage unit 129 into the RAM 128, and executes the loaded program, thereby implementing the processing illustrated in this flowchart.

First, in step S301, the CPU 127 functions as the device control unit 122, and receives image data from the image processing apparatus 100 via the network 150. The CPU 127 stores the received image data into the storage unit 129. The processing then proceeds to step S302. In step S302, the CPU 127 functions as the OCR unit 124. Specifically, the CPU 127 reads the image data from the storage unit 129, and loads the read image data into the RAM 128. The CPU 127 performs OCR processing on the loaded image data, and outputs information about a recognized character string block. The information about the character string block here includes the position of the character string block, the size of the character string block, and a character string included in the character string block. The processing then proceeds to step S303. In step S303, the CPU 127 functions as the matching unit 125, and extracts a feature amount of the image data. The feature of the image of which the feature amount is extracted here is information about a character string block obtained in OCR. The CPU 127 saves the feature amount thus obtained, into the storage unit 129, together with the information about the character string block, in a set.

The processing then proceeds to step S304. In step S304, the CPU 127 functions as the matching unit 125, and performs matching between the feature amount obtained in step S303 and a feature amount of past image data. The matching here may be performed in a manner suitable for the feature amount. For example, in a case where a local feature amount of Scale Invariant Feature Transform (SIFT) is used, matching may be performed between local feature amount groups included in the respective two pieces of image data, and the number of matching pieces may be used as a matching degree. In a case where information about a character string block is used as a feature amount, a degree of overlap between character string blocks included in the respective two pieces of image data may be used as a matching degree. For example, a Jaccard index can be used for the degree of overlap. The matching method employed here is not limited to these examples, and an appropriate known technique can be used.

The processing then proceeds to step S305. In step S305, the CPU 127 functions as the matching unit 125, and determines whether similar image data of the past is present, by evaluating the matching degree with respect to the past image data, calculated in step S304. If the CPU 127 determines that the similar image data is present (YES in step S305), the CPU 127 assigns an image cluster ID that is the same as the image cluster ID of the similar image data of the past, and the processing proceeds to step S306. Here, the image cluster ID is an ID (identification information) for managing similar image data as a group. Such a group is formed because similar pieces of image data are highly likely to adopt the same file naming rule. Here, the file naming rule is managed in a unit of the image cluster ID. On the other hand, if the CPU 127 determines that the similar image data is not present (NO in step S305), the CPU 127 assigns a new image cluster ID to the image data, and the processing proceeds to step S310.

In step S306, the CPU 127 functions as the file name presumption unit 126, and selects a file naming rule associated with the image cluster ID assigned to the image data. The processing then proceeds to step S307. In step S307, the CPU 127 functions as the file name presumption unit 126, and generates a recommended file name for the image data, based on the file naming rule selected in step S306.

FIG. 8 is a diagram illustrating a file naming rule according to the first exemplary embodiment.

Here, the file naming rule is, for example, represented by what is illustrated in Part (1) in FIG. 8. Part (1) in FIG. 8 illustrates a template of a file name. The template is generated when the user determines a file name using the UI illustrated in FIG. 7 ("_" is selected in the delimiter specification pull-downs 707 and 708). An item surrounded by brackets < and > is to be replaced according to a rule for each piece of image data, and corresponds to a field of the UI screen illustrated in FIG. 7. In other words, the field 701 in FIG. 7 corresponds to a <OCR area 1> 801 of the template. Here, the OCR area 1 provided as a replacement target is the character string block 501 associated with the field 701 by the user. Further, the field 702 in FIG. 7 corresponds to a <OCR area 2> 802 of the template. Here, the OCR area 2 provided as a replacement target is the character string block 503 associated with the field 702 by the user. Furthermore, the field 703 in FIG. 7 corresponds to a <Date> 803 of the template. Here, "Date" is provided as a replacement target, because the field 703 and the date button 710 indicating the meta-information of "date" are associated with each other by the user in FIG. 7. The other part "_" corresponds to a specified delimiter. The delimiter specification pull-down 707 in FIG. 7 corresponds to a delimiter "_" 804 of the template, and the delimiter specification pull-down 708 in FIG. 7 corresponds to a delimiter "_" 805 of the template. Further, ".pdf" is an extension of a file that is not illustrated in FIG. 7. A replacement rule of each pair of brackets < and > will be described next. The <OCR area 1> means replacement with a character string in a specific character string block of image data. Part (2) in FIG. 8 illustrates an example of the rule.

A sub-rule ID 810 in Part (2) in FIG. 8 indicates a sub-rule ID of the OCR area 1. Each time the rule is updated, the sub-rule ID is incremented, and used for management of a sub-rule history. A character string block ID 811 indicates a character string block ID in similar image data. Here, the OCR area 1 of the past similar image data corresponds to a character string block ID "0001". To use this information, at first, a character string block of image data in processing is associated with a character string block ID of past image data. The character string block ID is then assigned to the character string block of the image data in processing. The determination of the corresponding area is performed using similarity, such as similarity between the positions of character string blocks, or similarity between the character strings of OCR results.

When the OCR area 1 (the character block ID "0001") in the image data in processing is determined, predetermined processing defined by the rule is added to a character string of an OCR result included in the OCR area 1 of the image data in processing, so that a character string to be included in a file name is determined. An OCR setting 812 in Part (2) in FIG. 8 indicates an example of the rule. In this case, the character string is defined as a fixed character string "ORDER", in the OCR setting 812. Therefore, the character string reading "ORDER" is output in a fixed manner, without depending on the character string of the OCR result. This is because, from the file naming result of the past similar image data, a rule is presumed to be the fixed character string: "ORDER", and no variable character string is to be entered in this portion. Therefore, the OCR area 1 is independent of the accuracy of OCR.

Part (3) in FIG. 6 illustrates a sub-rule of the <OCR area 2>. Different points from the sub-rule of the OCR area 1 are a character string block ID 620 and an OCR setting 821. The OCR area 2 corresponds to a character string block ID "0003" as indicated with the character string block ID 820. Therefore, a character string of the character string block of the character block ID "0003" in the image data in processing is a replacement target. Further, the OCR setting 821 is applied to the character string in processing. The OCR setting 821 to be applied here is to remove the character string "To" at the front. In other words, setting is made to change "To Nishitoride Hakusan Shokai Corporation" to "Nishitoride Hakusan Shokai Corporation".

Part (4) in FIG. 8 illustrates a sub-rule of the <Date>. The <Date> means that it is a date to be defined by a detail rule, and to be used for a file name. For example, in Part (4) in FIG. 8, as defined by a detail rule 830, setting is made in such a manner that a date when image data is scanned is to be converted into a form of "YYYYMMDD", and to be used for a file name. Therefore, in this example, Jul. 25, 2016 is converted into "20160725".

Part (5) in FIG. 8 illustrates a file name to be generated when the above-described rule is applied to the image data displayed in FIG. 7. Here, a file name applied by the user is simply regenerated. However, in a case where another similar image data having the same image cluster ID is input, the same rule is also applied, and the generated file name is recommended.

FIG. 9 is a diagram illustrating details of another file naming rule according to the first exemplary embodiment. Here, another file naming rule will be described with reference to FIG. 9, for a different part From FIG. 8.

As with Part (1) in FIG. 8, Part (1) in FIG. 9 is a template of a file name, and includes four areas, which are an OCR area, a date, an arbitrary character string, and a user name. Here, although a UI corresponding to Part (1) pull-down and one field are added, and the association of each field is changed, as compared with FIG. 7. Part (2) to Part (5) in FIG. 9 illustrate sub-rules of the respective areas.

Part (2) in FIG. 9 illustrates a detail rule of a <OCR area 1>. In an OCR setting 901, a character string that is an OCR result of the OCR area 1 is defined to be modified to a character string of 16 characters formed by deleting a character string reading "Date" at the tail. Here, the text type in OCR is not specified. Further, from an OCR false conversion history of past similar image data, a correction rule 902 for false conversion for each character is defined. Here, "E" is to be modified to "3". The correction rule can be generated from, a character-string modification history of the user.

Part (6) in FIG. 9 illustrates an example in which the rule in Part (2) in FIG. 9 is actually applied. Here, assume that, a character string included in the OCR area 1 as the original OCR result is "Order Number R23E2 Date", and a correct character string is "Order Number R2332", In this case, the OCR setting 901 is applied, and the fixed character string "Date" is deleted. As a result, a character string 305 included in the original OCR result is modified to a character string 906 reading "Order Number R23E2". Here, the text type in OCR is not specified and therefore, re-execution of the OCR and modification of the OCR result are not performed. Next, the correction rule 902 for false conversion of an individual character is applied, and the (character string is modified to a character string 907 reading "Order Number R2332".

In this way, a detail rule is applied to a simple OCR result. Thereby, even if there is an error in the OCR result, a character string can be modified to a correct character string.

To this end, it is important to presume an appropriate detail rule. Details of rule presumption will be described below. The <Date> is defined by the detail rule in Part (3) in FIG. 9, and to be added to the file name. This is similar to Part (3) in FIG. 8. The <Arbitrary character string> means that a character string defined by a detail rule 903 in Part (4) in FIG. 9 is to be added to the file name. The character string is a character string defined by the user in past similar image data. In the example illustrated in Part (4) in FIG. 9, replacement with a character string "Person in charge" is to be made, as defined by the detail rule 903. In a case where a character string defined by the user is not fixed for similar image data, the rule of the part is not defined. In this case, other part of a file name is recommended to the user, and for the part, the user may input for each piece of image data on a UI. The <User name> means that a user name defined by a detail rule 904 in Part (5) in FIG. 9 is to be added to the file name. In the example illustrated in Part (5) in FIG. 9, an actual personal name is acquired and used by making an inquiry to a Lightweight Directory Access Protocol (LDAP) server by using a login name, as defined by the detail rule 904. The login name may be directly used without making an inquiry to the LDAP server.

Performing the above-described conversion results in, for example, a file name of the image data based on the template of the file name in Part (1) in FIG. 9, as illustrated in Part (7) in FIG. 9. The file name thus created is presented as a recommended file name. The recommended file name may be a plurality of file names, in a case where there is a plurality of possibilities due to ambiguity of a rule, or in a case where there is a plurality of rules.

Returning to FIG. 3, the description will continue. In step S308, the CPU 127 transmits the recommended file name generated in the file naming unit 123, and information necessary for a UI screen related to the recommended file name, to the image processing apparatus 100 via the network 150. The information to be transmitted here is information about the OCR result of the image data and the recommended file name, as described above. In the information about a template of a file name, a file name actually generated upon replacement, and information about a character string block associated with an OCR area of past image data. The association mentioned here means that a character string block ID is made to be common to past similar image data. Afterward, the CPU 127 stops the processing, until receiving a file naming result from the image processing apparatus 100.

The processing then proceeds to step S309. In step S309, the CPU 127 functions as the device control unit 122. Specifically, the CPU 127 receives information about a file naming result from the image processing apparatus 100 via the network 150, and saves the received information into the storage unit 129. The information to be received here includes information indicating whether the recommended file name is used for an actual file name, a file name finally determined, information about a character string block of OCR used for a file name, and information indicating that a character string of a character string block of OCR is modified by the user. The information to be received further includes information about meta-information such as a date used for a file name, and information about an arbitrary character string input by the user. After processing of S309, in step S312, the CPU 127 functions as the file name presumption unit 126, and updates a file naming rule. In a case where there is a sufficient amount of image data having an image cluster ID that is the same as the image cluster ID of the image data in processing, and the file name recommended by the file name presumption unit 126 is directly used by the user, the accuracy of the file naming rule is sufficient. In such a case, the CPU 127 may not update the file naming rule in step S312.

Next, the processing when proceeding from step S305 to step S310 will be described.

First, in step S310, the CPU 127 functions as the device control unit 122, and transmits information 100 via the network 150. In this processing, a recommended file name is not transmitted in the case that a file name cannot be recommended. However, a default recommended file name might be transmitted. As for a character string block ID that is information about a character string block of OCR, there is no past similar image data to be associated with and therefore, a new ID is assigned. Although there is no recommended file name presumed from the operation of the user, a default recommended file name based on a template of a file name may be transmitted. Afterward, the CPU 127 stops the processing, until receiving a file naming result from the image processing apparatus 100.

The processing then proceeds to step S311. In step S311, the CPU 127 functions as the device control unit 122. Specifically, the CPU 127 receives information about a file naming result from the image processing apparatus 100 via the network 150, and saves the received information into the storage unit 129. The information to be received here is similar to the information to be received in step S309, except for information about whether a recommended file name is used.

Upon the execution of step S309 or step S311, the processing proceeds to step S312.

Otherwise, the CPU 127 reads an existing file naming rule from the storage unit 129 by using new data obtained in step S309 or step S311, and updates the file naming rule. When there is no existing file naming rule, a new file naming rule is created. The update of the file naming rule is performed in the file name presumption unit 126, which searches for a presumable rule by using a common final file name of an image data group having the same image cluster ID. In this way, the CPU 127 saves the created, new file naming rule, or the updated file naming rule, into the storage unit 129.

In a case where a template concept similar to the one described with reference to FIG. 8 is provided, and an image cluster ID is new, a template of a file name is presumed. In this case, if a UI similar to the UI described with reference to FIG. 7 is prepared, contents set by the user are directly used for the template of the file name. Subsequently, a detail rule is presumed for each template component. In that case, it is difficult to presume a common rule because there is only one piece of image data and therefore, the contents set by the user may be directly used.

Assume that information for forming a template of a file name lacks, due to a restriction on a UI. In this case, it is necessary to presume a template itself of a file name, and highly accurate presumption cannot be performed if the number of pieces of image data is insufficient. In such a case, each time the image data increases, a template of a file name is presumed. This presumption is to presume what kinds of component form a file name.

On the other hand, in a case where an image cluster ID is not new, a detail rule of each template component in a template of a file name is updated.

An example of update of the detail rule of the <OCR area 1> in the template of the file name in Part (1) in FIG. 9 will be described with reference to FIG. 10.

FIG. 10 is a diagram illustrating an example of the update of the rule of the <OCR area 1> in FIG. 9 according to the first exemplary embodiment.

First, Part (1) in FIG. 10 illustrates the current detail rule of the OCR area 1. The rule is similar to the rule in Part (2) in FIG. 9. Part (2) in FIG. 10 illustrates a result of applying the rule.

Here, an image cluster ID 1001 is an ID for expressing similar image data, and the same ID is assigned to pieces of similar image data. An image ID 1002 is an ID unique to image data. With respect to an image ID "53" indicated with an image ID 1003, a character string "Order Number T2020" indicated as a rule application result 1004 is obtained by final application of the detail rule by the user, and a character string "Order Number T2020" indicated as a user modification result 1005 is obtained by final modification by the user. These character strings "Order Number T2020" and "Order Number T2020" are different.

Here, a rule common to three pieces of image data is presumed. Three images all have a character string "Order Number", as indicted by the user modification result 1005 as well as user modification results 1006 and 1007. With respect to the image ID "53", as indicted by the user modification result 1005, the character string "Order Number T2020" is obtained by modification performed by the user. Therefore, it is highly likely that "Order Number" is a fixed character string. Accordingly, a rule defining "Order Number" as a fixed character string is added. Further, in the example of the image ID "53", when the rule application result 1004 and the user modification result 1005 are compared with each other, "T" is modified to "T" by the user. Therefore, the conversion rule is also added. This results in generation of a rule illustrated in Part (3) in FIG. 10.

In Part (3) in FIG. 10, as indicated with an OCR setting 1008, the fixed character string "Order Number" is added to the OCR setting rule in Part (1) in FIG. 10. In addition, a rule for modifying "7" to "T" is added, as indicated with an individual false conversion correction rule 1009. Part (4) in FIG. 10 illustrates a result assumed to be obtained in a case where the rule is applied. This also makes it unnecessary for the user to make a modification in the image ID "53", as indicated with a user assumption modification result 1010.

This rule can be continuously updated to a more reliable rule, as the image data increases. For example, assume that the amount of the image data having the image cluster ID "3" further increases, and image data having information about an OCR area 3 as illustrated in Part (1) in FIG. 11 is added.

At this point, the rule in Part (3) in FIG. 10 is applied, and image IDs "65" and "70" are not modified by the user, in user modification results 1101 and 1102. Meanwhile, in a user modification result 1103, a modification is made for an image ID "81" by the user. When a character string 1104 of individual conversion correction rule application and the user modification result 1103 are compared with each other, "q" is modified to "9" and "I" is modified to "1", by the user. Therefore, it is conceivable that the conversion rule may be added as a new rule. However, considering that the part is a four-digit number sequence in all pieces of the past image data having the same image cluster ID "3", a rule defining the part as a four-digit number sequence is added. This is an OCR setting rule 1106 in Part (2) in FIG. 11. In this process, the rule for converting "E" to "3", which is a rule added in the past, is removed because this is included in the added number restriction. This is an individual false conversion correction rule 1107 in Part (2) in FIG. 11. If the user manually specifies such a complicated rule from the beginning, a burden on the user considerably increases. In addition, a UI becomes complicated and thus, operability decreases. However, a burden on the user can be reduced and a command rule can be updated to an optimum rule, by thus changing and adding a rule, according to a history of contents of modification performed by the user.

Figure 11:
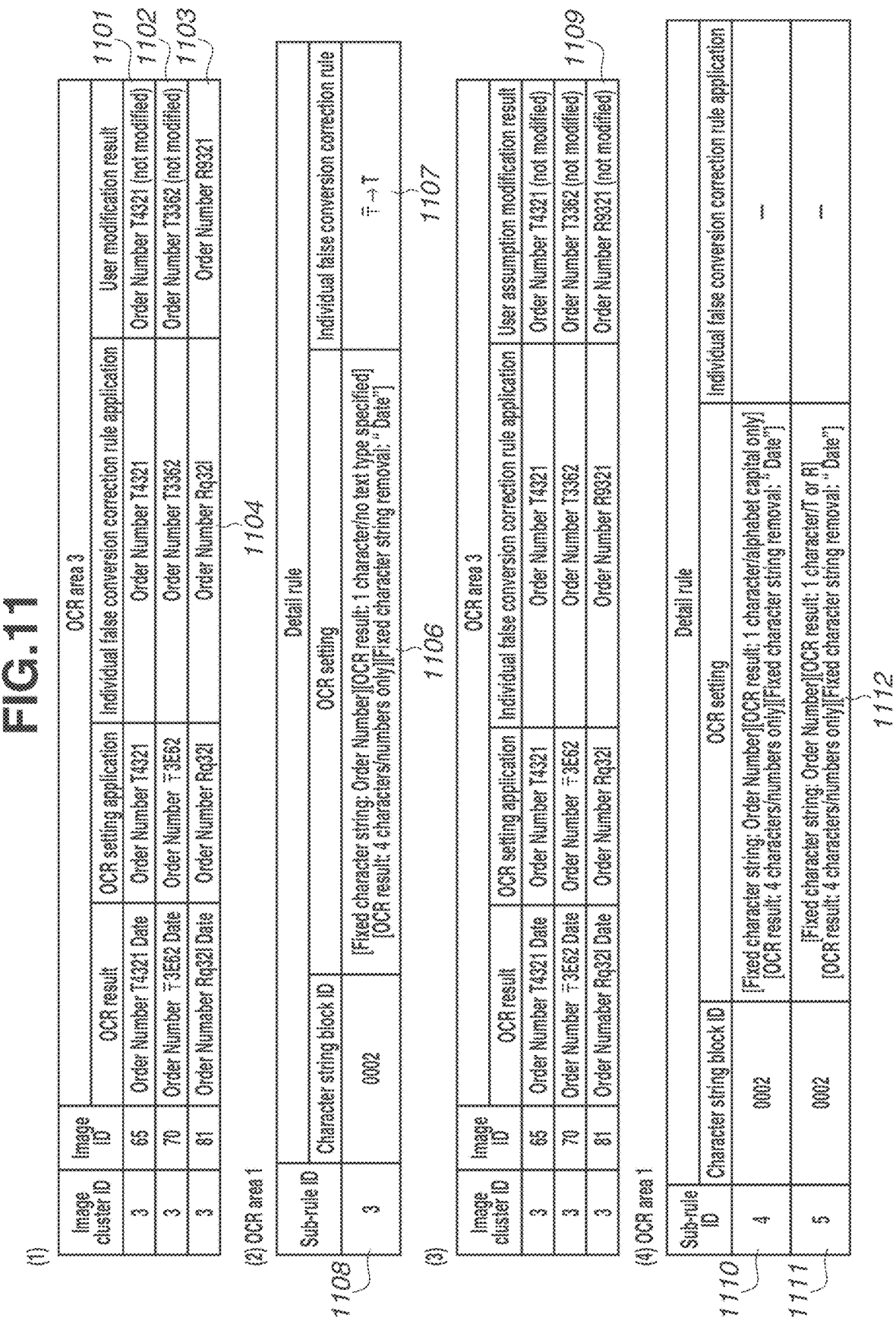
FIG. 11 is a diagram illustrating an example of OCR setting of a file naming rule according to the first exemplary embodiment.

Part (3) in FIG. 11 illustrates a result assumed to be obtained in a case where the updated rule in Part (2) in FIG. 11 is applied to the image data in Part (1) in FIG. 11. It is found that, in a user assumption modification result 1109 of the image ID "81" in Part (3) in FIG. 11, modification by the user is not assumed, and thus a better rule is provided.

Updating of the rule is continued in this manner, and a rule in Part (4) in FIG. 11 is assumed to be finally obtained. A sub-rule ID "3" indicated, with a numeral 1108 in Part (2) in FIG. 11 is updated to a sub-rule ID "4" indicated with a numeral 1110 in Part (4) in FIG. 11, and is further updated to a sub-rule ID "5" indicated with a numeral 1111. An OCR setting 1112, which is the rule of the sub-rule ID 5, is a rule that, can automatically modify a character recognition result with high probability thanks to many restrictions on an OCR result, even if the OCR result is incorrect. Further, specific processing to be performed in the OCR setting 1112 include conversion of a head character string to the fixed character string "Order Number", character recognition of one character limited to two text types (T or R), character recognition of four characters limited to numbers, and removal of the fixed character string "Date".

Apparently, this is much more complicated, and resistance to an error in character recognition is improved, as compared with the initial OCR setting 901 illustrated in Part (2) in FIG. 9. The number of pieces of image data necessary for presuming such a rule is large, as compared with the presumption of the OCR setting 901.

As to which rule is applicable, usefulness of each rule may be determined by holding possible basic rules beforehand, customizing these rules for a target image cluster ID, and applying the customized rules. In a case where a plurality of rules is useful, which rule is to be selected is determined according to the number of pieces of image data having the same image cluster ID. In a case where the number of pieces of image data is small, many errors may occur if a versatile rule is selected. Therefore, in the case where the number of pieces of image data is small, a restrictive rule is selected. Subsequently, a versatile rule is applied in stages. Such a case can be thereby dealt with. In the examples illustrated in FIGS. 9 to 11, the rule is selected based on such a policy.

In this way, the rules of a plurality of pieces of image data having the same image cluster ID are used, so that a naming rule can be updated to a naming rule capable of presuming a more complicated file name. Using the naming rule, a file name more desirable to the user can be presented. The rule updating method described here is only an example. For example, a probability model may be introduced, and a method of introducing a rule based on the probability of occurrence of a character string may be used.

As described above, according to the first exemplary embodiment, the user only repeats the normal file naming operation to cause automatic learning of a file naming rule. As a result, a more appropriate file name for the user can be recommended. This can greatly reduce a burden on the user who sets a rule for determining a file name.

A second exemplary embodiment of the present invention will be described below. A different part from the above-described first exemplary embodiment will be described. The different part from the first exemplary embodiment is relevant to the flowchart in FIG. 3, and will be described with reference to a flowchart in FIG. 12. A configuration of each of the image processing apparatus 100 and the file naming apparatus 120, and a system including these apparatuses according to the second exemplary embodiment, are similar to those of the above-described first exemplary embodiment. Therefore, the description thereof will be omitted.

The flowchart in FIG. 12 illustrates processing for generation of information for naming a file of image data by the file naming apparatus 120 according to the second exemplary embodiment. The processing illustrated in the flowchart begins upon receipt of image data from the image processing apparatus 100. The CPU 127 loads a program from the storage unit 129 into the RAM 128, and executes the loaded program, thereby implementing the processing illustrated in the flowchart. In FIG. 12, steps similar to the steps in FIG. 3 are provided with the numerals that are the same as the numerals of the steps in FIG. 3, and the description thereof will be omitted. However, in the second exemplary embodiment, in a case where there is a plurality of pieces of similar image data with a high matching degree in step S305, a plurality of image cluster IDs may be assigned to image data in processing. When the plurality of image cluster IDs is assigned, step S306 to step S309 are performed for each of the image cluster IDs.

Assume that the processing thus proceeds from step S309 to step S1201. In step S1201, the CPU 127 functions as the device control unit 122, and reads information about a file naming result saved in the storage unit 129. The CPU 127 then determines whether a recommended file name is used for an actual file name. Here, if the CPU 127 determines that the recommended file name is not used for the actual file name (NO in step S1201), the processing proceeds to step S1203, because there is a possibility that an image cluster ID may be assigned by mistake. In a case where a plurality of recommended file names is present and none of these recommended file names is used for the actual file name (NO in step S1201), the processing also proceeds to step S1203. In a case where any one of the recommended file names is used for the actual file name (YES in step S1201), the processing proceeds to step S1204.

Assume that the processing proceeds from step S311 to step S1202. In step S1202, the CPU 127 functions as the device control unit 122, and reads a file naming result saved in the storage unit 129, and information about an existing file naming rule. The CPU 127 then applies the existing file naming rule to the image data in processing, and performs a search to find whether there is a naming rule that can generate a file name determined by a user. If a naming rule that can generate the file name determined by the user is found as a result of the search (YES in step S1202), the processing proceeds to step S1203, because there is a possibility that an image cluster ID may be assigned by mistake. If no naming rule that can generate the file name determined by the user is found as a result of the search (NO in step S1202), the processing proceeds to step S1204. In step S1203, the CPU 127 functions as the file name presumption unit 126. Specifically, the CPU 127 verifies a possibility that an incorrect image cluster ID may be assigned, and reassigns an image cluster ID, if necessary. Here, the case where the processing proceeds from step S1201 to step S1203 includes a possibility that an existing file naming rule may be inappropriate, and a possibility that an existing image cluster ID assigned to the image data may be inappropriate. To distinguish between these two possibilities, the CPU 127 performs a step similar to step S312 in FIG. 3, thereby verifying whether the file naming rule can be updated to a file naming rule that can appropriately give a file name to the image data in processing. In a case where there is a plurality of recommended file names, the CPU 127 performs the verification for each of all image cluster IDs. In a case where the file naming rule is successfully updated as a result of the verification, the existing file naming rule is inappropriate, while the image cluster ID has no problem. Here, as for the image cluster ID for which the file naming rule is not successfully updated, association with the image data in processing is deleted. As a result, in the next processing and afterward, only an image ID, which matches with the image data of the current processing target and is not deleted, is associated with an image similar to image data in processing. Therefore, the possibility of recommending a file name desired by the user can be raised.

In contrast, in a case where none of the file naming rules is successfully updated, the image cluster ID has a problem, while the existing file naming rule has no problem. This occurs, for example, when new image data being similar but having a different rule is input. In that case, all of existing image cluster IDs associated with the image data in processing are deleted, and a new image cluster ID is assigned to the image data in processing.

In a case where the processing proceeds from step S1202 to step S1203, the CPU 127 assigns an image cluster ID, which is associated with the naming rule that can generate the file name determined by the user and that is found by the search in step S1202, to the image data in processing.

Even if an incorrect image cluster ID is assigned to the image data in processing, this can be modified by the reassignment of the image class ID in step S1203. Since the image cluster ID can be thus modified, normal operation can be maintained, even if a threshold for determining whether there is similar image data in step S305 is not appropriate. Moreover, even in a situation where there is a large amount of similar image data, the normal operation can be maintained.

The processing then proceeds from step S1203 to step S1204. In step S1204, the CPU 127 functions as the file name presumption unit 126, and updates a file naming rule. The processing here is basically similar to step S312 in FIG. 3, and thus only a different part will be described.

In a case where the processing proceeds from step S1201 to step S1204, even if there is a plurality of recommended file names, only image data associated with the recommended file name used for the actual file name becomes a processing target. Here, as for an image ID that does not become a processing target, association with the image data being the processing target is deleted. This makes it possible to raise the possibility of recommending a file name desired by the user, as in step S1203. In contrast, in a case where the processing proceeds from step S1203 to step S1204, the assigned new image ID, and the image ID for which the file naming rule is successfully updated in step S1203, become a processing target. Meanwhile, in a case where the processing proceeds from, step S1202 to step S1204, only one image ID is present to be a processing target and therefore, the image data of the ID becomes a processing target. In this way, only a specific image cluster ID is used as a processing target. This makes it possible to update a presumption rule of an appropriate file name, even if matching with a plurality of pieces of image data is allowed. The processing then proceeds to step S1205. In step S1205, the CPU 127 functions as the device control unit 122. Specifically, the CPU 127 removes image data of an original document after a lapse of a predetermined period among pieces of past image data, from targets in presuming a file naming rule, or reduces a weight assigned to such image data. Alternatively, the CPU 127 removes such image data from matching targets. This changes the file naming rule, and can thereby prevent recommendation of a file naming rule that has not already been used.

According to the above-described second exemplary embodiment, a naming rule for a file name can be appropriately updated, even when matching between image data in processing and past image data is incorrect. This can reduce the possibility of occurrence of such a matching error, afterward. Further, a naming rule for a file name can also be appropriately updated, when a plurality of file names is recommended. Furthermore, an appropriate file name can also be recommended, when a file naming rule is changed.

Other Exemplary Embodiments

Any of the image processing apparatuses described in the present specification can also be implemented by such processing that a program that implements one or more functions of any of the above-described exemplary embodiments is supplied to a system or apparatus via a network or storage medium. One or more processors in a computer of the system or apparatus read the program, and execute the read program. Moreover, any of these image processing apparatuses can also be implemented by a circuit (e.g., an application-specific integrated circuit (ASIC)) that implements one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-014513, filed Jan. 30, 2017, which is hereby incorporated by reference herein in its entirety.

What is claimed is:

1. An image processing apparatus comprising:
   a character recognition processing unit configured to execute character recognition processing on image data;
   an acquisition unit configured to acquire one or more character string blocks included in the image data, from the image data;
   a selection unit configured to select a character string block to be used for setting of a file name, from among the one or more character string blocks acquired by the acquisition unit; and
   a setting unit configured to set the file name of image data, in accordance with a naming rule, by using a character recognition result of the character recognition processing unit for the character string block selected by the selection unit;
   a managing unit configured to manage one or more correction results of correction by a user operation for the file name set by the setting unit; and
   a generation unit configured to generate a new naming rule based on the one or more correction results managed by the management unit,
      wherein the new naming rule includes a character string before the correction by the user operation and a character string after the correction by the user operation.

2. The image processing apparatus according to claim 1, further comprising a display unit configured to display the one or more character string blocks acquired by the acquisition unit, in an identifiable manner,
   wherein the selection unit selects a character string block from among the one or more character string blocks displayed by the display unit, according to a user instruction.

3. The image processing apparatus according to claim 2, wherein the display unit displays the file name of the image data set by the setting unit.

4. The image processing apparatus according to claim 3, further comprising an acceptance unit configured to accept a user instruction for modifying the file name set by the setting unit,
   wherein the display unit displays the file name modified by the user instruction accepted by the acceptance unit.

5. The image processing apparatus according to claim 1, further comprising a reading unit configured to read an original document,
   wherein the image data is obtained by reading the original document by the reading unit.

6. The image processing apparatus according to claim 1, further comprising a storage unit configured to store identification information about image data, in association with a file naming rule set by the setting unit,
   wherein the setting unit sets a file name of new image data, by using a file naming rule associated with identification information about image data stored in the storage unit similar to the new image data, among one or more file naming rules stored in the storage unit.

7. The image processing apparatus according to claim 6, wherein the file naming rule includes information for identifying the character string block selected by the selection unit.

8. The image processing apparatus according to claim 6, wherein the acquisition unit acquires a character string block, a position of the character string block, and a size of the character string block, from the image data.

9. The image processing apparatus according to claim 8, wherein the setting unit selects a file naming rule associated with identification information about image data similar to the new image data, from the one or more file naming rules stored in the storage unit, by using the position and the size of the character string block acquired by the acquisition unit.

10. The image processing apparatus according to claim 9, further comprising an acceptance unit configured to accept a modification for the file name set by the setting unit from a user,
    wherein the storage unit stores information about the modification for the file name accepted by the acceptance unit, in association with the image data.

11. The image processing apparatus according to claim 10, wherein the setting unit sets the file name of the new image data, by using the information about the modification for the file name associated with the identification information about the image data similar to the new image data.

12. The image processing apparatus according to claim 1, wherein the setting unit is capable of setting predetermined information about the image data, as a file name of the image data.

13. The image processing apparatus according to claim 12, wherein the predetermined information is at least information indicating a name of a user logging in when the image data is read, or a date and time when the image data is generated.

14. A control method for an image processing apparatus, the control method comprising:
    performing character recognition processing on image data;
    acquiring one or more character string blocks included in the image data;
    selecting a character string block to be used for setting of a file name of the image data, from among the acquired one or more character string blocks;
    setting the file name of the image data, in accordance with a naming rule, using a character recognition result in the character recognition processing for a character included in the selected character string block;
    managing one or more correction results of correction by a user operation for the set file name; and
    generating a new naming rule based on the one or more managed correction results,
       wherein the new naming rule includes a character string before the correction by the user operation and a character string after the correction by the user operation.

15. The image processing method according to claim 14, further comprising displaying the acquired one or more character string blocks, in an identifiable manner,
    wherein the selected character string block is a character string block selected from among the displayed one or more character string blocks according to a user instruction.

16. A storage medium storing a computer program executing a control method for an image processing apparatus, the control method comprising:
    performing character recognition processing on image data;
    acquiring one or more character string blocks included in the image data;
    selecting a character string block to be used for setting of a file name of the image data, from among the acquired one or more character string blocks;

setting the file name of the image data, in accordance with a naming rule, using a character recognition result in the character recognition processing for a character included in the selected character string block;

managing one or more correction results of correction by a user operation for the set file name; and generating a new naming rule based on the one or more managed correction results, wherein the new naming rule includes a character string before the correction by the user operation and a character string after the correction by the user operation.

\* \* \* \* \*